United States Patent [19]
Wilson

[11] Patent Number: 4,792,173
[45] Date of Patent: Dec. 20, 1988

[54] FLUID ACTUATED LIMB

[75] Inventor: James F. Wilson, Durham, N.C.

[73] Assignee: Duke University, Durham, N.C.

[21] Appl. No.: 115,243

[22] Filed: Oct. 30, 1987

[51] Int. Cl.[4] .......................... B25J 15/12; B25J 18/06; B66C 1/46; F15B 15/10

[52] U.S. Cl. .................................... 294/119.3; 92/92; 414/7; 901/21; 901/22; 901/37; 901/39

[58] Field of Search .................... 294/63.2, 86.4, 98.1, 294/99.1, 119.3; 52/2 H, 2 J, 2 K; 74/469, 479; 91/36; 92/13.2, 35, 37, 48, 90–92; 138/130, 144; 414/4, 7, 729, 735; 623/26, 27, 57, 64, 65; 901/2, 14, 16–19, 21, 22, 27, 30, 31, 36, 37, 39, 50

[56] References Cited

U.S. PATENT DOCUMENTS

| | | |
|---|---|---|
| 2,765,930 | 10/1956 | Greer et al. |
| 3,284,964 | 11/1966 | Saito . |
| 3,343,864 | 9/1967 | Baer . |
| 3,574,386 | 4/1971 | Frost ............................ 294/119.3 |
| 3,601,442 | 8/1971 | Orndorff, Jr. . |
| 3,640,564 | 2/1972 | Kuster . |
| 3,645,173 | 2/1972 | Yarlott . |
| 3,712,481 | 1/1973 | Harwood . |
| 3,854,383 | 12/1974 | Paynter . |
| 3,913,307 | 10/1975 | Cardinal ....................... 294/119.3 X |
| 3,981,528 | 9/1976 | Andorf et al. . |
| 4,108,050 | 8/1978 | Paynter . |
| 4,551,061 | 11/1985 | Olenick . |
| 4,621,965 | 11/1986 | Wilcock . |
| 4,739,692 | 4/1988 | Wassam et al. .................. 901/22 X |

FOREIGN PATENT DOCUMENTS

| | | | |
|---|---|---|---|
| 617254 | 7/1978 | U.S.S.R. ............................ | 294/119.3 |
| 837845 | 6/1981 | U.S.S.R. ............................... | 901/22 |
| 1187980 | 10/1985 | U.S.S.R. ............................... | 901/22 |
| 1229027 | 5/1986 | U.S.S.R. ............................... | 901/21 |
| 1371494 | 10/1974 | United Kingdom ............. | 294/119.3 |
| 2100826B | 1/1985 | United Kingdom . | |

OTHER PUBLICATIONS

Wilson and Orgill publication entitled "Linear Analysis of Uniformly Stressed, Orthotropic Cylindrical Shells", Journal of Applied Mechanics, Jun., 1986, vol. 53, pp. 249–256.

Primary Examiner—Johnny D. Cherry
Attorney, Agent, or Firm—Richard E. Jenkins

[57] ABSTRACT

A fluid actuated limb comprising an elongate flexible core member having a first plurality of bellows extending parallel to the core member and being radially spaced from the core member around substantially the entire circumference thereof. A second plurality of bellows are radially spaced from the core member and helically wrapped around the length of the core member in a first helical direction, and a third plurality of bellows are radially spaced from the core member and helically wrapped around the length thereof in a second helical direction opposite to the first helical direction. Fluid air pressure selectively applied to the limb results in limb movements including extension and contraction, bending with resistance to torsion, right hand and left hand rotation, and combinations of the aforementioned movements.

30 Claims, 4 Drawing Sheets

FLUID ACTUATED LIMB

GOVERNMENT INTEREST

This invention was made with Government support under Grant MDA 903-84-C-0243 awarded by the Department of Defense. The government has certain rights in this invention.

DESCRIPTION

1. Technical Field

This invention relates to a fluid actuated limb which upon selective introduction of fluid pressure will perform movements either alone or in combination including longitudinal extension or contraction, transverse bending, and clockwise or counter-clockwise rotation about the longitudinal axis of the limb. Moreover, the limb possesses optimal geometric proportion in order to provide for maximum inherent strength to carry a load at its load-engaging end while maintaining the self-weight of the limb to a minimum. This invention is particularly directed to a fluid actuated limb having great strength and substantially universal movement capabilities in order to lend it to use in the robotics field for multiple applications including manipulating arms, legs for walking machines, and as grippers on the end of arms for holding or manipulating objects.

2. Background Art

Fluid actuated limbs for use as robotic limbs or gripping devices have heretofore been proposed for use in many applications. However, all limbs known to date have not been fully adequate for reasons known to those familiar with this art. Thus, the objective of providing a continuously flexible limb that when fixed at one end will carry a payload at its tip and is adapted to perform substantially universal fluid actuated motions, either alone or in combination, including longitudinal extension or contraction, clockwise or counter-clockwise rotation, and transverse bending in a selected plane had not been successfully accomplished until the advent of applicant's invention.

A number of fluid actuated tube-type limb configurations are disclosed in the prior art but none possesses the unique geometric proportioning and movement capability of the instant invention. For example, U.S. Pat. No. 3,284,964 to Saito discloses a flexible beam structure which is capable of only a bending movement. The limb is not provided with adequate means to resist twisting or torsion as a payload is lifted, and this lack of torsional stiffness substantially obviates the limb's effectiveness in positioning payloads other than by movement in a single, vertical plane parallel to the longitudinal axis thereof. In U.S. Pat. No. 3,645,173 to Yarlott there is disclosed a fluid actuator limb which is capable only of contracting. The limb primarily supports only longitudinal loads and is not sufficiently strong to act as a load-carrying member for a payload that exerts transverse and/or torsional forces thereon. U.S. Pat. No. 3,981,528 to Andorf, et al. discloses a fluid actuated limb known in the trade as the SIMRIT finger. This fluid actuated robotic finger is capable of bending only in a single plane.

Also of interest, U.S. Pat. No. 4,108,050 to Paynter discloses a fluid-driven torsional operator for turning rotary valves such as butterfly valves, ball valves or the like. The device disclosed therein is adapted to simultaneously provide torsional motion and contraction. However, the two motions of the limb cannot be separately controlled and transverse bending motion cannot be effected by the fluid actuated operator U.K. Patent No. GB 2100826B to Morrison describes a remotely controlled fluid actuated limb which is adapted for bending in a selected arbitrary plane and wherein a separate sleeve bellows is provided for desired extension movement. The limb suffers substantially the same deficiency as the Saito patent described above in that it does not possess torsional stiffness or provide for operator-controlled torsional stiffness as does the limb of the present invention. Other patents of possible interest include U.S. Pat. Nos. 2,765,930; 3,343,864; 3,601,442; 3,640,564;, 3,712,481; 4,551,061; and 4,621,965.

Therefore, applicant's fluid actuated limb is believed to fill a long-felt need for a limb possessing high torsional stiffness and optimal geometry for high ratio of payload to limb weight, and which will perform either alone or in combination movements including longitudinal extension or contraction, clockwise or counter-clockwise twisting, and transverse bending in a selected arbitrary plane. These and other long-felt needs in the art are answered by the fluid actuated limb of this invention as described and claimed hereinafter.

DISCLOSURE OF THE INVENTION

In accordance with the present invention, there is provided a fluid actuated limb which comprises an elongate flexible core member secured at one end to a support and having a first plurality of bellows extending substantially parallel to the core member and being positioned around the circumference of the core member in radially spaced relationship. A second plurality of bellows are provided which are radially spaced from the core member and helically wrapped around the length thereof in a first helical direction, and a third plurality of bellows are provided which are also radially spaced from the core member and helically wrapped around the length thereof in a second helical direction which is opposite to the first helical direction of the second plurality of bellows.

The limb of the present invention is adapted so that the bellows systems thereof may be selectively actuated as necessary to effect longitudinal extension or contraction, clockwise or counter-clockwise twisting, transverse bending in a selected arbitrary plane, and its geometry has been optimized to provide an optimal ratio of payload to limb weight as is described more fully hereinbelow. Furthermore, the fluid actuated limb is particularly adapted to provide torsional stiffness as desired when the limb is used to lift and position a payload.

It is therefore an object of the present invention to provide an improved fluid actuated limb possessing multiple movement capabilities not capable of being provided in a single limb heretofore.

It is another object of the present invention to provide an improved fluid actuated limb which possesses a geometrical design which provides a high ratio of payload to limb weight.

It is still another object of the present invention to provide a fluid actuated arm which possesses enhanced torsional resistance when a payload is being lifted or positioned by the limb.

BRIEF DESCRIPTION OF THE DRAWINGS

Some of the objects of the invention having been stated, other objects will become evident as the description proceeds, when taken in connection with the accompanying drawings, in which.

BEST MODE FOR CARRYING OUT THE INVENTION

Figure 1:
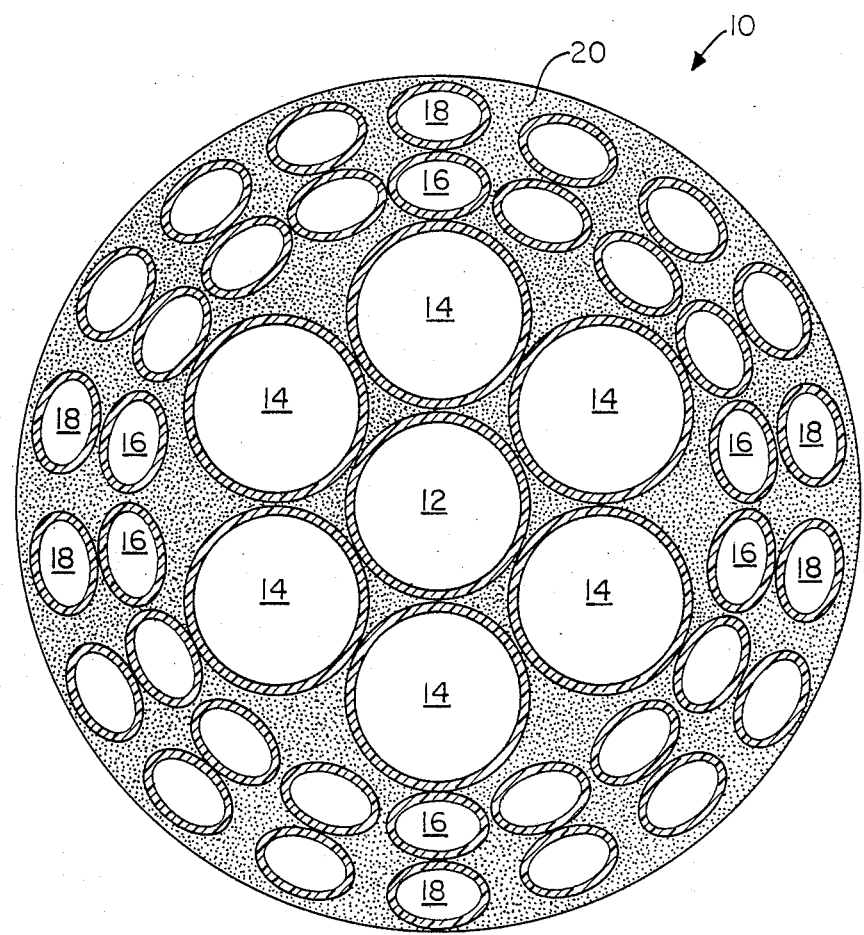
FIG. 1 is a cross-sectional view of a first embodiment of the fluid actuated limb of the present invention.
Figure 2:
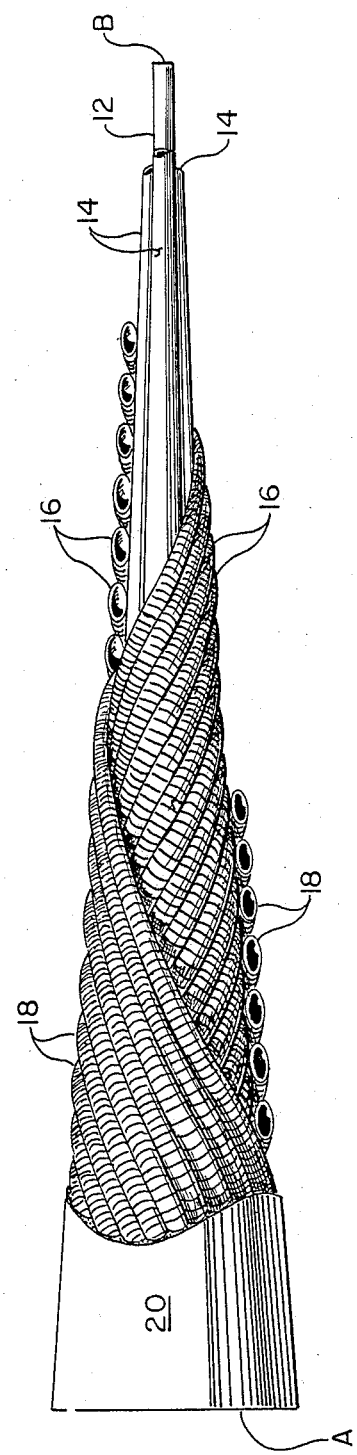
FIG. 2 is a side elevation view, with parts broken away for clarity, of the first embodiment of the fluid actuated limb of the present invention.

Referring now to the drawings, a first embodiment of the present invention, indicated generally as 10, is shown in FIGS. 1 and 2. Fluid actuated limb 10 is intended to be connected at base or end A to a support and suitable fluid pressure supply source (not shown) which is conventional and a matter of design choice. The remote or load carrying end B of fluid actuated limb 10 is intended to be connected to a payload by conventional means (not shown) known to those familiar with the robotics art.

With reference to FIGS. 1 and 2, it can be seen that fluid actuated limb 10 comprises five basic elements. An elongate flexible core member 12 is the central member of limb 10 and may be either a bellows or a smooth, flexible tube that, as a matter of design choice, may include strength reinforcement elements therein. Surrounding core member 12 are six satellite bellows 14 which extend parallel to and substantially coextensive with the length of core member 12. As will be explained more fully hereinafter, satellite bellows 14 are each tapered from end A to end B of limb 10 so as provide a desired geometric design to limb 10 which results in a maximum ratio of payload to limb weight. An alternate design choice has core element 12 tapered with satellite bellows 14 each of constant cross sectional area. Although six satellite bellows 14 are shown in the drawings, it is contemplated that from four to eight satellite bellows 14 could be incorporated into the limb of the present invention.

Eighteen bellows 16 are helically wrapped around satellite bellows 14 in a constant pitch right hand helix (see FIG. 2). Although eighteen bellows are shown in the drawings, it is contemplated that from four to twenty bellows 16 could be utilized. Eighteen bellows 18 are helically wrapped around bellows 16 in a constant left hand helix configuration, but it is contemplated that from four to twenty bellows 18 could be utilized. A resilient material 20, most suitably a polymeric material, is provided to fill the interstices between the elements of limb 10. Also, although not shown in the drawings, reinforcement elements such as metal wire, NYLON, KEVLAR, or other suitable strength materials could be molded or otherwise incorporated into bellows 14, 16 and 18 as well as resilient polymeric material 20. All of the elements described hereinbefore which comprise limb 10 are bonded together in a suitable matter at points of contact therebetween. The bonding serves to provide integrity to fluid actuated limb 10 as it extends and contracts, bends add rotates during movement of a payload.

As can be seen with reference to FIG. 2, satellite bellows 14 are tapered as each extends from end A to end B of limb 10 and do thereby provide a tapered configuration to limb 10. It has been found during substantial testing by applicant that the optimal design for limb 10, or the design which has the highest possible ratio of payload weight to limb weight, is the structure shown in FIGS. 1 and 2 wherein six satellite bellows 14 are provided which have an equal outside radius to core member 12 and wherein satellite bellows 14 are tapered such that the outside diameter of limb 10 varies as the one-third power of its length from the loaded end. This geometric relationship gives limb 10 the ability to carry its maximum transverse load at end B while maintaining the weight of limb 10 to a minimum. This relationship is shown as follows:

$$D = cy^{\frac{1}{3}} + D_o$$

where $D_o$ is the diameter of limb 10 at end B, D is the diameter of limb 10 at a distance coordinate y measured from B, and c is a constant. The alternate design choice noted hereinbefore has core element 12 tapered with satellite bellows 14 each of constant cross sectional area which achieves the same advantages as the design first described. Although other geometrical relationships are certainly contemplated by the present invention, this particular one has been found after engineering calculations to be particularly advantageous in the use of the fluid actuated limb of the present invention.

Figure 3:
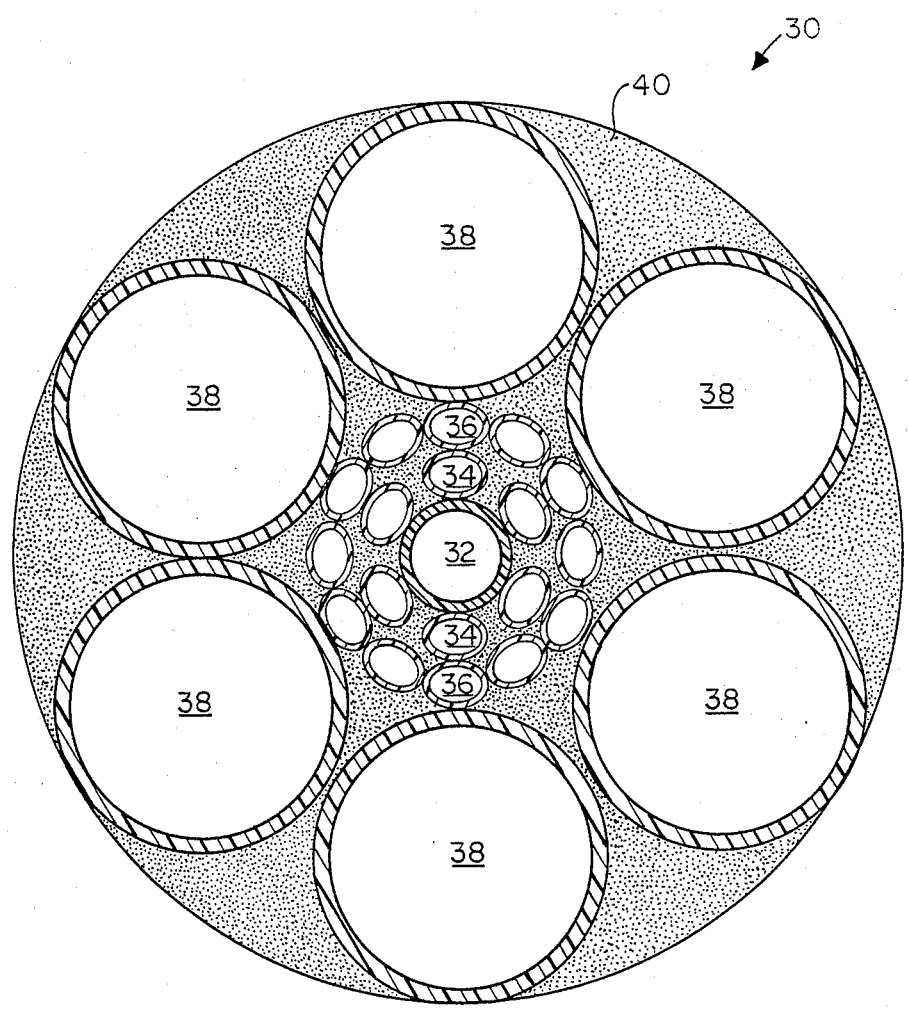
FIG. 3 is a cross-sectional view of a second embodiment of the fluid actuated limb of the present invention.
Figure 4:
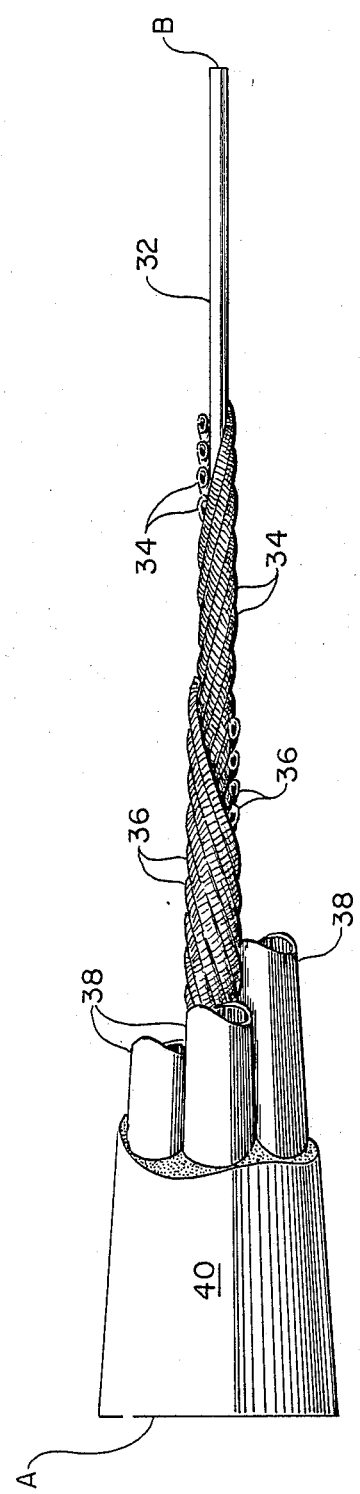
FIG. 4 is a side elevation view, with parts broken away for clarity, of the second embodiment of the fluid actuated limb of the present invention.

With reference at this time to FIGS. 3 and 4, a second embodiment of the fluid actuated limb of the present invention is shown and generally designated 30. Limb 30 comprises an elongate flexible core element or member 32 which like core member 12 of the first embodiment may be either a bellows or a smooth flexible tube that may include reinforcement for enhanced strength. Immediately adjacent core member 32 are six bellows 34 which are wrapped around core member 32 in a constant right-hand helix. Immediately over bellows 34 are twelve bellows 36 wrapped in a left-hand helix around bellows 34. Positioned around the circumference of helical bellows 36 are six satellite bellows 38 which extend parallel to and substantially coextensive with core element 32. As in the embodiment shown in FIGS. 1 and 2, satellite bellows 38 are tapered from end A to end B of limb 30 so as to provide a preferred geometrical configuration to limb 30 according to the formula set forth hereinbefore. A resilient polymeric material 40 is provided in the interstices of fluid actuated limb 30.

As with the first embodiment of the present invention shown in FIGS. 1 and 2, the component parts of limb 30 may be fashioned from suitable metal, rubber or polymeric material, or a combination of these materials. Moreover, the component parts may include reinforcing strands of metal ire, NYLON, KEVLAR, or the like molded therein. All of the component parts are bonded together for integrity at their points of contact or interface.

In addition to the outside diameter of limb 30 varying according to the formula set forth hereinbefore, for maximum ratio of payload weight to limb weight, limb 30 should include six satellite bellows 38 having an identical radius to the radius formed by the cluster of the twelve bellows 36 wrapped around six bellows 34 and core element 32. This specific configuration incorporating tapered satellite bellows 38 to provide an outside geometry to limb 30 corresponding to the formula previously set forth above has been found through engineering calculations to provide the highest ratio of payload to limb weight. However, as with limb 10 shown in FIGS. 1 and 2, the invention contemplates that other configurations are possible utilizing anywhere from 4 to 20 bellows 34, 4 to 20 bellows 36, and from 4 to 8 satellite bellows 38.

The operative action of limbs 10 and 30 will now be described in detail to assure a clear understanding of the inherent movement capabilities of said limbs. Firstly, equal fluid pressure can be applied to satellite bellows 14 (FIGS. 1 and 2) and 38 (FIGS. 3 and 4) to cause limbs 10 and 30, respectively, to extend uniformly and an equal vacuum can be applied to the same bellows to cause the limbs to contract uniformly along their longitudinal axis. Equal fluid pressure may be applied to three adjacent bellows 14 (FIGS. 1 and 2) and 38 (FIGS. 3 and 4) of limbs 10 and 30, respectively, to cause the limbs to bend about a neutral axis that is the tangent line dividing the pressurized and unpressurized satellite bellows. The degree of bending of limbs 10 and 30 would depend on the stiffness of the limb, the magnitude and orientation of the payload at the tip or end B, and the magnitude of the applied internal fluid pressure to the satellite bellows of the limbs.

Equal fluid pressure can be applied to all right-hand helically wrapped bellows 16 of the first embodiment and 34 of the second embodiment of the present invention to cause limbs 10 and 30, respectively, to twist in the direction of a left-handed screw about the longitudinal axis of the limb. In the same fashion, equal fluid pressure may be applied to left-hand helically wrapped bellows 18 of limb 10 and 36 of limb 30 to cause each limb to twist in the direction of a right-hand screw about the longitudinal axis of the limb. Additionally, and very important to the instant invention, internal fluid pressure may be applied in proper proportion to helically wrapped bellows 16 and 18 of limb 10 and 34 and 36 of limb 30 to negate twisting of the limb about its longitudinal axis in order to prevent undesired twisting which would otherwise occur as the limb is bent while maneuvering a payload in a three dimensional workspace. This is a problem with many prior art fluid actuated limbs which has been overcome by the limb of the instant invention.

Therefore, the helically wrapped bellows of limbs 10 and 30 serve not only to provide clockwise and counter-clockwise movement to the limbs, but they also serve to prevent rotation of the limb about its longitudinal axis so as to maintain bending stability to the limb. For fluid actuated limbs constructed according to preferred embodiments 10 and 30 disclosed herein, it has been found that helically wrapped bellows 16 and 18 of limb 10 and 34 and 36 of limb 30 should be set at a constant pitch or angle of between 15 and 25 degrees to the longitudinal axis of the limb in order to provide the most effective resistance to torsion or twisting of the limb while a payload is being maneuvered in a three dimensional workspace. In order to maximize twisting or rotational capability about the longitudinal axis of limbs 10 and 30, helically wrapped bellows 16 and 18 of limb 10 and 34 and 36 of limb 30 should be wrapped at a constant helical angle of between 40 and 50 degrees to the longitudinal axis of the limb. Other design constructions are clearly possible with applicant's invention other than those which have been discussed in detail above.

It will thus be seen that there has been described above a novel fluid actuated limb capable of movement not heretofore possible with a singular limb and possessing geometric proportions resulting in optimal payload weight to limb weight ratios.

It will be understood that various details of the invention may be changed without departing from the scope of the invention. Furthermore, the foregoing description is for the purpose of illustration only, and not for the purpose of limitation—the invention being defined by the claims.

What is claimed is:

1. A fluid actuated limb comprising:
   an elongate flexible core member adapted to be secured at one end to a support;
   a first plurality of flexible elongate tubes extending substantially parallel to said core member and being radially spaced therefrom around substantially the entire circumference of said core member, said first plurality of tubes being adapted for longitudinal extension and contraction in response to increases and decreases, respectively, in fluid pressure applied thereto;
   a second plurality of flexible elongate tubes being radially spaced from said core member and helically wrapped around substantially the entire length thereof in a first helical direction, said second plurality of tubes being adapted for longitudinal extension and contraction in response to increases and decreases, respectively, in fluid pressure applied thereto; and
   a third plurality of flexible elongate tubes being radially spaced from said core member and helically wrapped around substantially the entire length thereof in a second helical direction opposite to said first helical direction, said third plurality of tubes being adapted for longitudinal extension and contraction in response to increases and decreases, respectively, in fluid pressure applied thereto;
   whereby said limb may be selectively actuated to effect movement including extension and contraction, bending, right hand and left hand twisting, and desired combinations thereof.

2. A fluid actuated limb according to claim 1 wherein said elongate flexible core member is a tube.

3. A fluid actuated limb according to claim 1 wherein said elongate flexible core member is a bellows.

4. A fluid actuated limb according to claim 1 said first plurality of tubes, said second plurality of tubes and said third plurality of tubes are bellows.

5. A fluid actuated limb according to claim 1 wherein said first plurality of tubes are positioned next adjacent to said core member, said second plurality of tubes are wrapped around said first plurality of tubes, and said third plurality of tubes are wrapped around said second plurality of tubes.

6. A fluid actuated limb according to claim 5 wherein said core member and each of said first plurality of tubes have an equal radius, and said first plurality of tubes are each tapered in the direction remote from the secured end of said core member.

7. A fluid actuated limb according to claim 1 wherein said second plurality of tubes are wrapped around said core member, said third plurality of tubes are wrapped around said second plurality of tubes, and said first plurality of tubes are positioned radially outwardly and substantially around the circumference of said third plurality of tubes.

8. A fluid actuated limb according to claim 7 wherein each of said first plurality of tubes has a radius equal to the radius of the bundle formed by said core member wrapped by said second and third plurality of tubes, and said limb is tapered in the direction remote from the secured end thereof.

9. A fluid actuated limb according to claim 6 or 8 wherein the outside diameter of said limb varies according to the equation:

$$D = cy^{\frac{1}{2}} + D_o$$

where $D_o$ is limb diameter at the unsecured end of the limb, $D$ is limb diameter, $c$ is a constant, and $y$ is the distance from the unsecured end of said limb to $D$.

10. A fluid actuated limb according to claim 1 wherein said limb includes a compressible material in the interstices thereof.

11. A fluid actuated limb according to claim 10 wherein said compressible material comprises a polymeric cushioning material.

12. A fluid actuated limb according to claim 1 wherein said first plurality of tubes comprises about 4–8 tubes.

13. A fluid actuated limb according to claim 1 wherein said second plurality of tubes comprises about 4–20 tubes.

14. A fluid actuated limb according to claim 1 wherein said third plurality of tubes comprises about 4–20 tubes.

15. A fluid actuated limb comprising:
an elongate flexible core member adapted to be secured at one end to a support;
a first plurality of flexible elongate tubes extending substantially parallel to said core member and positioned next adjacent to and substantially around the circumference thereof, said first plurality of tubes being adapted for longitudinal extension and contraction in response to increases and decreases, respectively, in fluid pressure applied thereto;
a second plurality of flexible elongate tubes helically wrapped around said first plurality of tubes in a first helical direction, said second plurality of tubes being adapted for longitudinal extension and contraction in response to increases and decreases, respectively, in fluid pressure applied thereto; and
a third plurality of flexible elongate tubes helically wrapped around said second plurality of tubes in a second helical direction opposite to said first helical direction, said third plurality of tubes being adapted for longitudinal extension and contraction in response to increases and decreases, respectively, in fluid pressure applied thereto;
whereby said limb may be selectively actuated to effect movements including extension and contraction, bending, right hand and left hand twisting, and desired combinations thereof.

16. A fluid actuated limb according to claim 15 wherein said elongate flexible core member is a tube.

17. A fluid actuated limb according to claim 15 wherein said elongate flexible core member is a bellows.

18. A fluid actuated limb according to claim 15 wherein said first plurality of tubes, said second plurality of tubes and said third plurality of tubes are bellows.

19. A fluid actuated limb according to claim 15 wherein said core member and said first plurality of tubes have an equal radius, and said limb is tapered in the direction remote from the secured end thereof.

20. A fluid actuated limb according to claim 19 wherein the outside diameter of said limb varies according to the equation:

$$D = cy^{\frac{1}{2}} + D_o$$

where $D_o$ is the diameter at the unsecured end of limb, $D$ is limb diameter, $c$ is constant, and $y$ is the distance from the unsecured end of said limb to $D$.

21. A fluid actuated limb according to claim 15 wherein said limb includes a polymeric cushioning material in the interstices thereof.

22. A fluid actuated limb according to claim 15 wherein said first plurality of tubes comprises 4–8 tubes, said second plurality of tubes comprises 4–20 tubes, and said third plurality of tubes comprises 4–20 tubes.

23. A fluid actuated limb comprising:
an elongate flexible core member adapted to be secured at one end to a support;
a first plurality of flexible elongate tubes helically wrapped around said core member in a first helical direction, said first plurality of tubes being adapted for longitudinal extension and contraction in response to increases and decreases, respectively, in fluid pressure applied thereto;
a second plurality of flexible elongate tubes helically wrapped around said first plurality of tubes in a second helical directed opposite to said first direction, said second plurality of tubes being adapted for longitudinal extension and contraction response to increases and decreases, respectively, in fluid pressure applied thereto;
a third plurality of flexible elongate tubes extending substantially parallel to said core member and positioned radially outwardly from and around the circumference of said second plurality of tubes, said third plurality of tubes being adapted for longitudinal extension and contraction in response to increases and decreases, respectively, in fluid pressure applied thereto;
whereby said limb may be selectively actuated to effect movements including extension and contraction, bending, right hand and left hand twisting, and desired combinations thereof.

24. A fluid actuated limb according to claim 23 wherein said elongate flexible core member is a tube.

25. A fluid actuated limb according to claim 23 wherein said elongate flexible core member is a bellows.

26. A fluid actuated limb according to claim 23 wherein said first plurality of tubes, said second plurality of tubes and said third plurality of tubes are bellows.

27. A fluid actuated limb according to claim 23 wherein each of said third plurality of tubes has a radius equal to the radius of the bundle formed by said core member and said first and second plurality of tubes, and said limb is tapered in the direction remote from the secured end thereof.

28. A fluid actuated limb according to claim 27 wherein the outside diameter of said limb varies according to the equation:

$$D = cy^{\frac{1}{2}} + D_o$$

where $D_o$ is the diameter at the unsecured end of the limb, $D$ is limb diameter, $c$ is constant, and $y$ is the distance from the unsecured end of said limb to $D$.

29. A fluid actuated limb according to claim 23 wherein said limb includes a polymeric cushioning material in the interstices thereof.

30. A fluid actuated limb according to claim 23 wherein said first plurality of tubes comprises 4–20 tubes, said second plurality of tubes comprises 4–20 tubes, and said third plurality of tubes comprises 4–8 tubes.

* * * * *